Nov. 23, 1948.                    M. J. FIGMICK                     2,454,641
                          SAFETY HITCH FOR VEHICLES
                              Filed May 5, 1947
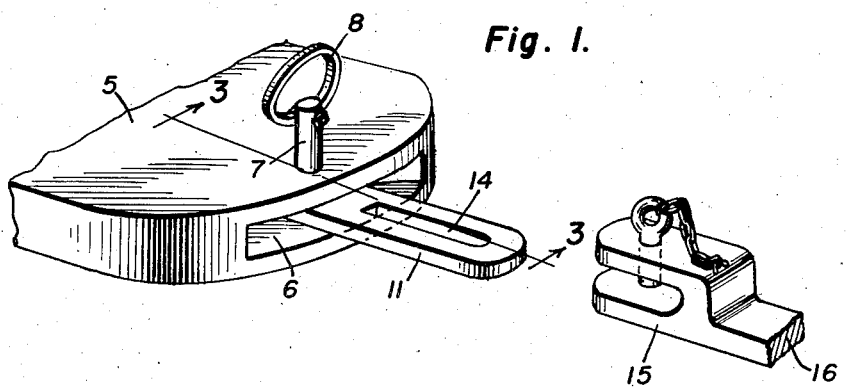
Fig. 1.
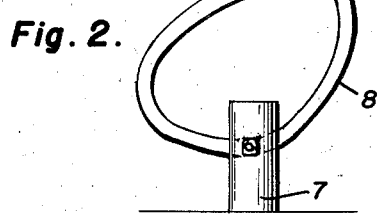
Fig. 2.
Fig. 3.
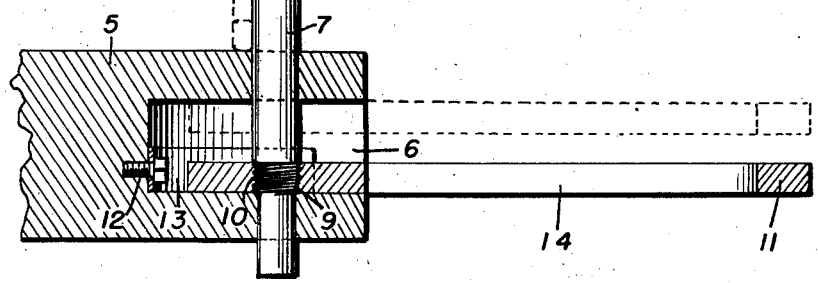
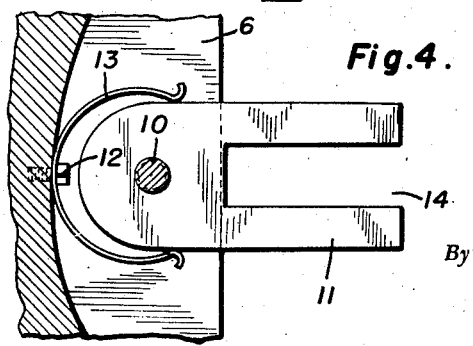
Fig. 4.
Inventor
Michael J. Figmick
By
Attorneys Patented Nov. 23, 1948

2,454,641

UNITED STATES PATENT OFFICE 2,454,641

SAFETY HITCH FOR VEHICLES

Michael J. Figmick, Cairnbrook, Pa.

Application May 5, 1947, Serial No. 746,015

3 Claims. (Cl. 213—75)

This invention relates to new and useful improvements in hitches and more particularly to a safety hitching device for mine cars.

The primary object of the present invention is to provide a hitch for mine cars including handle means, whereby an adjustment may be made to position the tongue carried by one of the car members, in the bifurcated element carried by a second car member, without the operator's hand becoming entangled between the car members.

Another important object of the present invention is to provide a pivotal tongue recessed in one of the car members and adapted for detachable locking engagement with the bifurcated element carried by a second car member.

A further purpose of the present invention is to provide a horizontally swingable tongue recessed in a car member, and a locking spring carried by the car member for normally holding the tongue in a fixed position.

A still further purpose of the present invention is to provide a device of the character referred to, which is simple and practical in construction, strong and durable in use, relatively inexpensive to manufacture, and otherwise well adapted for the purposes for which the same is intended.

Other objects and advantages reside in the details of construction and operation as more fully hereinafter described and claimed, reference being had to the accompanying drawings, forming part hereof, wherein like numerals refer to like parts throughout, and in which:

Figure 1 is a group perspective view of a vehicle hitch showing the device uncoupled;

Figure 2 is a fragmentary view in elevation of a pin carried by one of the members;

Figure 3 is an enlarged longitudinal vertical sectional view taken on line 3—3 of Figure 1; and Figure 4 is a horizontal sectional view taken through one of the car members to show the spring holding means for the tongue, a portion of which is illustrated.

Referring now to the drawings in detail, wherein for the purpose of illustration, I have disclosed a preferred embodiment of the present invention, the numeral 5 represents a first car member having a horizontal slot 6 of any shape in the forward end thereof.

Journaled in the member 5 and extending vertically through slot 6, is a pin 7 which is adapted to receive a removable handle grip 8 at its upper end.

Substantially at the center of pin 7 are provided screw threads 9, which are engageable with a threaded bore 10 in one end of a tongue 11, swingable horizontally in slot 6.

Secured by a bolt or the like 12 in the slot 6, is a substantially U-shaped leaf spring 13, which is adapted to occupy the lower portion of the slot.

A longitudinal slot 14 is provided in the outer end of tongue 11 and has detachable locking engagement with a bifurcated element 15 carried by a second car member 16, said element carrying a removable locking pin 17 which engages the slot 14 in a usual manner.

In order to position the tongue for engagement with elements 15, it is merely necessary to pull upwardly on the handle 8 so that the inner end of the tongue recessed above the spring 13 and the tongue may swing horizontally to engage element 15.

The handle may be used to raise the end of member 5 slightly if more adjustment is needed to position the tongue to the element 15.

In a normal position, the inner end of the tongue rests between the ends of spring 13 thereby yieldingly holding the tongue in a central position against swinging movement, as more clearly shown in Figure 4 of the drawings.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A vehicle hitch comprising a first member and a second member, a substantially horizontal slot provided in the first member, a substantially vertically disposed pin journaled in the first member and extending through the slot, said pin having a threaded portion intermediate its ends, a tongue having a threaded opening for engaging the threaded portion of the pin for swinging movement of tongue in the slot, hand gripping means carried by the pin for raising and rotating the same, spring means positioned in the lower plane of the slot for normally holding the tongue against swinging movement when the tongue is in a lowered position, said tongue being raisable with the pin to clear the spring for swinging movement of the former, and means carried by the second member for lockably engaging the tongue.

2. A vehicle hitch comprising a first member and a second member, a substantially horizontal slot provided in the first member, a substantially vertically disposed pin journaled in the first member and extending through the slot, a tongue having one end removably secured to the pin for swinging movement of tongue in the slot, hand gripping means carried by the pin for raising and rotating the same, spring means positioned in the lower plane of the slot for normally holding the tongue against swinging movement when the tongue is in a lowered position, said tongue being raisable with the pin to clear the spring for swinging movement of the former, said tongue having an outer end having a longitudinal slot therein, a bifurcated element carried by the second member, and a locking pin removably carried by the bifurcated element for slidably and pivotally engaging the slot formed in said tongue.

3. The embodiment of claim 1 wherein said spring means includes an arcuate spring fixed in said slot and loosely embracing one end of said tongue, said spring having bearing lips formed at its ends engaging opposite sides of the tongue.

MICHAEL J. FIGMICK.

REFERENCES CITED

The following references are of record in the file of this patent:

UNITED STATES PATENTS

| Number | Name | Date |
|---|---|---|
| 158,541 | Street | Jan. 5, 1875 |
| 309,194 | Buch | Dec. 16, 1884 |
| 351,734 | Brill | Nov. 2, 1886 |
| 358,190 | Doan | Feb. 22, 1887 |
| 369,576 | Wilson | Sept. 6, 1887 |
| 450,238 | Kauffelt | Apr. 14, 1891 |